United States Patent [19]

Marten et al.

[11] Patent Number: 5,155,140
[45] Date of Patent: Oct. 13, 1992

[54] USE OF ADHESIVE MIXTURES CONTAINING GUM ARABIC FOR GLUEING THE LONGITUDINAL SEAM OF CIGARETTE TUBE

[75] Inventors: Klaus Marten, Neuss; Johannes Huehne, Duesseldorf; Horst Buxhofer, Erkrath, all of Fed. Rep. of Germany

[73] Assignee: Henkel Kommanditgesellschaft auf Aktien, Duesseldorf 1, Fed. Rep. of Germany

[21] Appl. No.: 690,970

[22] PCT Filed: Nov. 2, 1989

[86] PCT No.: PCT/EP89/01313
§ 371 Date: Jul. 10, 1991
§ 102(e) Date: Jul. 10, 1991

[87] PCT Pub. No.: WO90/05169
PCT Pub. Date: May 17, 1990

[30] Foreign Application Priority Data
Nov. 11, 1988 [DE] Fed. Rep. of Germany ....... 3838255

[51] Int. Cl.$^5$ ................ C09J 105/14; A24C 5/24
[52] U.S. Cl. .................. 523/100; 156/336; 131/35; 131/37; 131/105; 131/284; 131/343; 131/345
[58] Field of Search .......... 523/100; 131/105, 37, 131/343, 345, 284, 35; 106/208, 213; 156/336

[56] References Cited

U.S. PATENT DOCUMENTS

| | | | |
|---|---|---|---|
| 3,625,225 | 12/1971 | Halter | 131/352 |
| 4,175,996 | 11/1979 | Battard et al. | 106/128 |
| 4,936,920 | 6/1990 | Keritsis et al. | 131/79 |

Primary Examiner—Nathan M. Nutter
Attorney, Agent, or Firm—Ernest G. Szoke; Wayne C. Jaeschke; Real J. Grandmaison

[57] ABSTRACT

The use of adhesive mixtures containing—per 100 parts by weight water—40 to 120 parts gum arabic, 3 to 80 parts by weight water soluble starch degradation products and/or carboxymethyl starch and/or gelatinized starch and, optionally, typical preservatives in aqueous solution and having a Brookfield (RVT) viscosity at 20° C. in the range from 1,000 to 15,000 and more especially in the range from 1,700 to 5,000 for glueing the longitudinal seam of cigarette tubes by machine, produces excellent glueing strength.

17 Claims, No Drawings

USE OF ADHESIVE MIXTURES CONTAINING GUM ARABIC FOR GLUEING THE LONGITUDINAL SEAM OF CIGARETTE TUBE

This invention relates to the use of adhesive mixtures containing—per 100 parts by weight water—40 to 120 parts gum arabic 3 to 80 parts by weight water-soluble starch degradation products and/or carboxymethyl starch and/or gelatinized starch and, optionally, typical preservatives in aqueous solution and having a Brookfield (RVT) viscosity at 20° C. in the range from 1,000 to 15,000 and more especially in the range from 2,000 to 5,000 mPa.s for glueing the longitudinal seam of cigarette tubes by machine.

For glueing the longitudinal seam of cigarette tubes by machine, there is a need for adhesives of natural raw materials to replace the dispersion glues used hitherto. Thus, DE-C 2 619 708 describes a gelatine-based adhesive mixture which, unfortunately, does not satisfy all the requirements of an adhesive for glueing longitudinal seams by machine using the nozzle application systems typically used in the cigarette industry. In terms of structure, the adhesive mixtures mentioned lie between aqueous systems and hotmelts and have to be applied to the paper to be glued from heated apparatus. However, as with all adhesives based on animal proteins, heating in particular involves the danger of decomposition with emission of unpleasant odors.

It is also known that adhesive mixtures in which one component consists of gum arabic may be used for the binding of paints, paper, and books. For example, in DE 626,010 an adhesive mixture consisting of 10 g crude rubber, 75 g gum arabic, 5 g sodium sulfate, 50 g starch, and 50 g waterglass in a total of 1200 g lime water is described (see Claim). The solution can also be diluted with water (see line 30). The adhesive mixture is used for gluing paper, metal, glass, porcelain, celluloid, fabrics, leather, and other materials, especially for gumming sheets of stamps (see lines 20 to 32).

From Chemical Abstracts, Vol. 96, 1982, p. 106, No. 8737h, an adhesive for bookbinding is known which consists of starch and 0.1–300% dextrin, gum arabic, or sodium silicate.

French Patent 408,254 pertains to the production of adhesive powder. It consists of 50% gum arabic, 5% wheat flour, 2% gum tragacanth, 5% dextrin, 15% sugar, and 3% magnesium sulfate. This powder is intended for use as a binder for paints and books as well as for the fixing of glass, sheet tin, and metals.

Accordingly, the present invention relates to the use of special adhesive mixtures which enable the longitudinal seams of cigarette tubes to be safely and permanently glued using the machines normally used in the cigarette industry, particularly taking the high production rates required in that industry into account, and which show no tendency to decompose with emission of unpleasant odors and do not require heated apparatus for application.

This problem is solved by the use of the above-mentioned adhesive mixtures based on gum arabic.

The types of gum arabic suitable for use in accordance with the invention should be of prime quality, for example so-called hand-picked types.

The water-soluble starch degradation products suitable for use in accordance with the invention include oxidatively or hydrolytically degraded starches and dextrins (roasted dextrins), particularly white and yellow dextrins, of the type described for example, in Ullmanns Enzyklopädie der Technischen Chemie, 4th Edition, Vol. 22, pages 191-194, Verlag Chemie Weinheim (1982). Generally speaking, thick-boiling dextrins are preferred. Typical representatives of these dextrins are a) medium-viscosity dextrins having a Brookfield RVT viscosity at 20° C. in the range from 1,000 to 8,000, as measured on a freshly prepared 60% solution,
b) high-viscosity dextrins having a Brookfield RVT viscosity at 20° C. in the range from 500 to 2,000, as measured on a freshly prepared 50% solution,
c) white dextrins having a Brookfield RVT viscosity at 20° C. in the range from 100 to 1,000 mPa.s, as measured on a freshly prepared 40% solution.

The dextrins mentioned above are all commercially available.

Carboxymethyl starches suitable for use in accordance with the invention are any of the commercially available types used in the adhesive industry.

Gelatinized starches suitable for use in accordance with the invention are potato, corn, tapioca and/or rice starch; cornstarch is particularly preferred. They are advantageously added as native starches to the adhesives to be used in accordance with the invention and are gelatinized by heating of the adhesive.

Suitable preservatives are the preservatives typically used in the adhesive and tobacco industry, particularly potassium sorbate and/or p-hydroxybenzoic acid ester.

In another advantageous embodiment of the invention, the adhesive mixtures are applied to the longitudinal seams of the cigarette tubes to be glued through nozzles in standard cigarette-making machines and produce an effective bond. The adhesive mixtures are normally applied at ambient temperature. However, if the adhesive mixtures are of relatively high viscosity, it may be advisable to heat them. In cases such as these, it is sufficient to heat only the application nozzles.

The invention is illustrated in the following by preferred examples of adhesive formulations suitable for use in accordance with the invention.

The adhesive formulations were prepared by introducing starch and/or dextrins, the size-reduced gum arabic and the preservative into water. The mixture was heated with stirring to 90° C. and left at that temperature for 15 minutes. The mixture was then cooled with stirring to ambient temperature and poured through a fine sieve.

EXAMPLE 1

49.945 parts by weight water,
10.000 parts by weight high-viscosity, yellow potato dextrin, Brookfield viscosity of a 40% solution (RVT, spindle 4, 20 r.p.m., 20° C., immediately after preparation) 2,300 mPa.s; 50% solution, spindle 5, 20 r.p.m., 20° C.,
10,800 mPa.s,
40.000 parts by weight gum arabic and
0.055 part by weight potassium sorbate.

The adhesive mixture had a Brookfield viscosity of 1,800 mPa.s (RVT, spindle 4, 20 r.p.m., 20° C.), a solids as determined by refractometry of approximately 46% and a pH value of 4.4.

EXAMPLE 2

49.945 parts by weight water, 13.000 parts by weight white dextrin (slightly degraded), Brookfield viscosity of a 40% solution (RVT, spindle 2, 20 r.p.m., 20° C.) 110 mPa.s.
37.000 parts by weight gum arabic,
0.055 part by weight potassium sorbate.

The product had a Brookfield viscosity (RVT, spindle 4, 20 r.p.m., 20° C.) of 3,500 mPa.s, a solids content as determined by refractometry of approximately 46% and a pH value of 4.3.

EXAMPLE 3

49.945 parts by weight water,
10.000 parts by weight native potato starch,
40.000 parts by weight gum arabic,
0.055 part by weight PHB ester.

The adhesive mixture had a Brookfield viscosity (RVT, spindle 4, 20 r.p.m., 20° C.) of 2,800 mPa.s, a solids content as determined by refractometry of approximately 45% and a pH value of 4.4.

EXAMPLE 4

49.945 parts by weight water,
10.000 parts by weight native cornstarch,
40.000 parts by weight gum arabic,
0.055 part by weight potassium sorbate.

The adhesive mixture had a Brookfield viscosity (RVT, spindle 4, 20 r.p.m., 20° C.) of 2,600 mPa.s, a solids content as determined by refractometry of approximately 44% and a pH value of 4.2.

The adhesive mixtures mentioned above were tested in a commercially available cigarette machine (Molins, Type Mark 9H); the glueing nozzles were standard nozzles with a heatable head. Excellent adhesive strength of the longitudinal seams was obtained. Forcible separation of the seams resulted in matting of the glued areas.

We claim:

1. An adhesive mixture for glueing the longitudinal seam of cigarette tubes by machine, said adhesive mixture consisting essentially of, per 100 parts by weight of water, about 40 to about 120 parts by weight of gum arabic, about 3 to about 80 parts by weight of a starch selected from the group consisting of water-soluble starch degradation products, carboxymethyl starch, and gelatinized starch, said adhesive mixture having a Brookfield viscosity at about 20° C. of between about 1,000 and about 15,000 mPa.s.

2. An adhesive mixture as in claim 1 wherein said water-soluble starch degradation products are selected from the group consisting of dextrins and oxidatively or hydrolytically degraded starches.

3. An adhesive mixture as in claim 1 wherein said water-soluble starch degradation products comprise medium-viscosity dextrins having a Brookfield viscosity at about 20° C. of between about 1,000 and about 8,000 mPa.s, as measured on a freshly prepared 60%/wt. aqueous solution.

4. An adhesive mixture as in claim 1 wherein said water-soluble starch degradation products comprise high-viscosity dextrins having a Brookfield viscosity at about 20° C. of between about 500 and about 2,000 mPa.s, as measured on a freshly prepared 50%/wt. aqueous solution.

5. An adhesive mixture as in claim 1 wherein said water-soluble starch degradation products comprise white dextrins having a Brookfield viscosity at about 20° C. of between about 100 and about 1,000 mPa.s, as measured on a freshly prepared 40%/wt aqueous solution.

6. An adhesive mixture as in claim 1 wherein said gelatinized starch is selected from the group consisting of potato, corn, tapioca and rice starch.

7. An adhesive mixture as in claim 1 containing a preservative.

8. An adhesive mixture as in claim 7 wherein said preservative is selected from the group consisting of potassium sorbate and p-hydroxybenzoic acid ester.

9. The process of glueing the longitudinal seam of cigarette tubes by machine, comprising applying to said seam an adhesive mixture consisting essentially of, per 100 parts by weight of water, about 40 to about 120 parts by weight of gum arabic, about 3 to about 80 parts by weight of a starch selected from the group consisting of water-soluble starch degradation products, carboxymethyl starch, and gelatinized starch, said adhesive mixture having a Brookfield viscosity at about 20° C. of between about 1,000 and about 15,000 mPa.s.

10. The process as in claim 9 wherein said water-soluble starch degradation products are selected from the group consisting of dextrins and oxidatively or hydrolytically degraded starches.

11. The process as in claim 9 wherein said water-soluble starch degradation products comprise medium-viscosity dextrins having a Brookfield viscosity at about 20° C. of between about 1,000 and about 8,000 mPa.s, as measured on a freshly prepared 60%/wt. aqueous solution.

12. The process as in claim 7 wherein said water-soluble starch degradation products comprise high-viscosity dextrins having a Brookfield viscosity at about 20° C. of between about 500 and about 2,000 mPa.s, as measured on a freshly prepared 50%/wt. aqueous solution.

13. The process as in claim 7 wherein said water-soluble starch degradation products comprise white dextrins having a Brookfield viscosity at about 20° C. of between about 100 and about 1,000 mPa.s, as measured on a freshly prepared 40%/wt. aqueous solution.

14. The process as in claim 7 wherein said gelatinized starch is selected from the group consisting of potato, corn, tapioca and rice starch.

15. The process as in claim 7 wherein said adhesive mixture contains a preservative.

16. The process as in claim 15 wherein said preservative is selected from the group consisting of potassium sorbate and p-hydroxybenzoic acid ester.

17. The process as in claim 7 wherein said adhesive mixture is applied to said seam by a nozzle in a conventional cigarette-making machine.

* * * * *